(12) United States Patent
Matsugashita

(10) Patent No.: US 8,705,072 B2
(45) Date of Patent: Apr. 22, 2014

(54) SERVER SYSTEM AND CONTROL METHOD THEREOF, AND COMPUTER-READABLE MEDIUM

(75) Inventor: Hayato Matsugashita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 6 days.

(21) Appl. No.: 13/543,622

(22) Filed: Jul. 6, 2012

(65) Prior Publication Data

US 2013/0044343 A1    Feb. 21, 2013

(30) Foreign Application Priority Data

Aug. 19, 2011    (JP) ................................ 2011-179915

(51) Int. Cl.
*G06K 15/00*    (2006.01)
*G06F 3/12*    (2006.01)

(52) U.S. Cl.
USPC .......................... 358/1.14; 358/1.1; 358/1.15

(58) Field of Classification Search
None
See application file for complete search history.

(56) References Cited

U.S. PATENT DOCUMENTS

2004/0190049 A1    9/2004    Itoh
2004/0263870 A1    12/2004    Itoh et al.

FOREIGN PATENT DOCUMENTS

EP    2339450 A2    6/2011
JP    2005-100340 A    4/2005

OTHER PUBLICATIONS

British Search Report dated Dec. 18, 2012 issued in corresponding GB Application No. 1214665.0.

*Primary Examiner* — Thierry L Pham
(74) *Attorney, Agent, or Firm* — Fitzpatrick, Cella, Harper & Scinto

(57) ABSTRACT

A server system comprises acquisition unit that acquires print data from a document management server based on information for acquiring the print data using received first authorization information without executing the authentication processing based on authentication information; transmission unit that issues second authorization information which permits an access to a cooperation server by executing authentication processing based on the authentication information transmitted from the printer management server, and transmits the second authorization information to the printer management server; and providing unit that provides, to the printer, the print data acquired by the acquisition unit or another print data generated based on the acquired print data without executing the authentication processing based on the authentication information in response to reception of a print data acquisition request from the printer which receives the second authorization information.

7 Claims, 11 Drawing Sheets

FIG. 7A

PRINTER TABLE (700)

| PRINTER ID (701) | AUTHORIZATION TOKEN A (702) | USER ID (703) | PASSWORD (704) | AUTHORIZATION TOKEN B (705) |
|---|---|---|---|---|
| PRT00000001 | ajbiela83ia3jcka | PRT00000001@1500AA | ************ | — |
| PRT00000002 | ok39s0iie8ai3ioa | PRT00000002@1500AA | ************ | CMS_auth01_eoij30··klj3oia8d0a3 |
| ... | ... | ... | ... | ... |

FIG. 7B

| AUTHENTICATION INFORMATION (710) |
|---|
| CLIENT CERTIFICATE (711) |
| /service/pkcs.p12 |

FIG. 8A

800 AUTHENTICATION INFORMATION

| 801 SERVER CERTIFICATE | 802 CLIENT ID | 803 CLIENT SECRET |
|---|---|---|
| /server/pkcs.p12 | 08badf0a-48b3-8fe3@1000000AAxI | ************ |

FIG. 8B

810 DOCUMENT DATA CORRESPONDENCE MAP

| 811 FIRST DOCUMENT URL | 812 FIRST AUTHORIZATION TOKEN | 813 SECOND DOCUMENT URL | 814 SECOND AUTHORIZATION TOKEN |
|---|---|---|---|
| /www.xxxxx.com/xxx/doc.html ?docid=0938203808283 | ok39s0iie8al3ioa | /prt.yyyy.com/yyy/doc.html ?job=a28be283defa | CMS_auth01_eoij30::klj3 oia8d0a |
| ... | ... | ... | ... |

FIG. 9A

USER TABLE (900)

| USER ID (901) | PASSWORD (902) | TENANT ID (903) |
|---|---|---|
| printAdmin@1500AA | ************ | 1500AA |
| PRT00000001@1500AA | ************ | 1500AA |
| PRT00000002@1500AA | ************ | 1500AA |
| 08badf0a-48b3-8fe3@1000000AAxl | ... | 1000000AA |

FIG. 9B

TOKEN TABLE (910)

| TOKEN ID (911) | EXPIRATION DATE (912) | ISSUANCE DATE/TIME (913) | USER ID (914) | TENANT ID (915) | CLIENT ID (916) |
|---|---|---|---|---|---|
| CMS_auth01_eoij30::klj3oia8d0a3 | 2600000 | 20110501120000 | PRT00000002@1500AA | 1500AA | 08badf0a-48b3-8fe3@1000000AAxl |
| CMS_auth01_kl8101::ai380kah38a8 | 2600000 | 20110601120000 | PRT00000001@1500AA | 1500AA | 08badf0a-48b3-8fe3@1000000AAxl |
| ... | | | | | ... |

FIG. 10

PRINT DATA TABLE (1000)

| USER ID (1001) | TENANT ID (1002) | PRINT DATA ID (1003) | PRINT DATA (1004) |
|---|---|---|---|
| PRT00000002@1500AA | 1500AA | a28be283defa | /doc/1500aa/a28be283defa |
| PRT00000001@1500AA | 1500AA | b18b83df15fd | /doc/1500aa/b18b83df15fd |
| ... | ... | ... | ... |

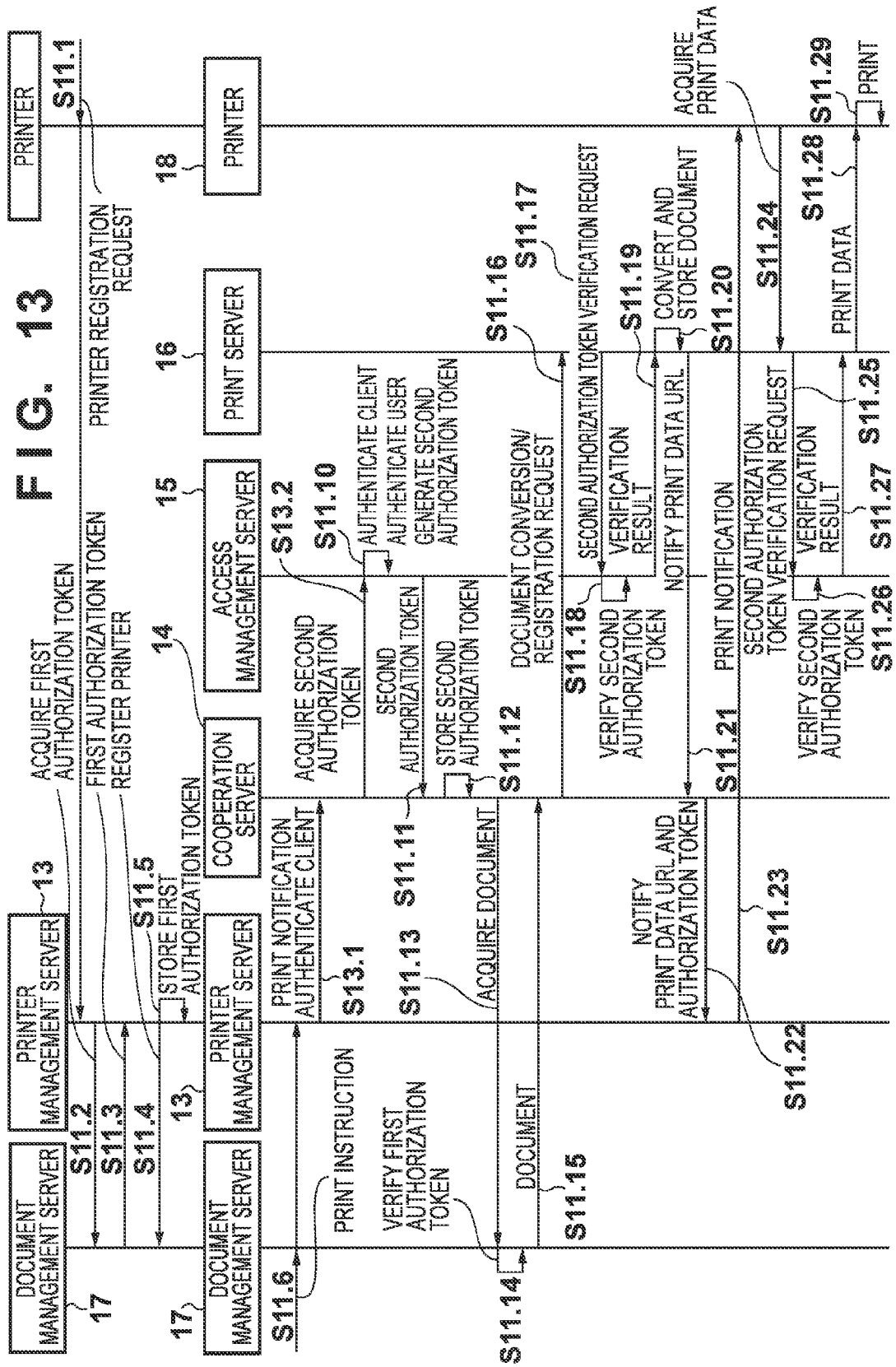

SERVER SYSTEM AND CONTROL METHOD THEREOF, AND COMPUTER-READABLE MEDIUM

BACKGROUND OF THE INVENTION

1. Field of the Invention

The present invention relates to a server which controls cooperation between a plurality of on-line services in an on-line print service implemented by mashing up the plurality of on-line services and a control method thereof, and a computer-readable medium.

2. Description of the Related Art

In recent years, the keyword "cloud computing" or "cloud" has been explosively spread around the IT industry. A shift from a conventional model, which purchases and uses computer hardware and software, to that which purchases and uses services on the Internet, has been accelerated.

Along with the progress of such cloud computing, a model which allows the user to use various services constructed on the Internet by connecting a printer or MFP to the Internet has been examined and put into practical use. From the viewpoint of a print service provided via the Internet, there is a use case in which a file, which undergoes document management on the Internet, is printed from a local printer. In addition to the document management service, an on-line service such as a printer management service, which manages states of a printer and MFP, has been conventionally provided from many service providers.

Conventionally, in order to attain print control of a printer, conversion into print data to be printed, print data transmission to a printer, and the like are executed by software known as a printer driver. The printer driver has to be installed in advance on a computer which uses the printer. However, when functions of the printer driver are provided as services on the Internet, a driver-less arrangement, in which a printer connected to the Internet directly receives print data to be printed and prints the print data, can be adopted. When such a print service is provided on the Internet, the user can register a document to be printed at an arbitrary location and timing, and a printer can receive print data to be printed from the Internet to execute a print operation. Such a use model will hereinafter be referred to as an "on-line print service".

A print service described in Japanese Patent Laid-Open No. 2005-100340 realizes a print operation using a printer placed at an arbitrary location using the following method. This print operation is realized by the method of exchanging print reservation, data, and printable application information between print environment sharing services put in respective places, and presenting a printable print location to the user. The print service described in Japanese Patent Laid-Open No. 2005-100340 allows the user to print data using a printer equipped in an arbitrary remote place.

In the related art, a repository server which stores documents is equipped in the same security domain as at least one print environment sharing service, and acquires document data using document use permission information. Then, the repository server transmits the acquired document data to a print servicer via another print environment sharing service to attain a print operation. Also, a print server which manages respective printers is directly connected to the aforementioned print environment sharing service, so that statuses of respective printers can be acquired in real time.

However, along with the progress of cloud services, many service providers may begin to take part in cloud services. For example, more document management services or printer management services will be provided on the Internet compared to before. An on-line service provided by a certain service provider and an on-line print service provided by a service provider different from the former service provider may be provided in different security domains. For this reason, a cooperation method between on-line services that does not impair security is required. For example, upon application to the related art, in order to allow a print environment sharing service to communicate with a document management service and print server set up by another service provider, security has to be assured using service authentication and authorization mechanisms set up by the other service provider.

SUMMARY OF THE INVENTION

According to one aspect of the present invention, there is provided a server system, which is configured to communicate with a document management server which provides print data, and a printer management server connected to a printer which executes print processing based on the print data, the server system comprising: receiving unit configured to receive, from the printer management server, information for acquiring the print data, and first authorization information which is issued by executing authentication processing based on authentication information and permits an access to the document management server; acquisition unit configured to acquire the print data from the document management server based on the information for acquiring the print data using the received first authorization information without executing the authentication processing based on the authentication information; transmission unit configured to issue second authorization information which permits an access to a cooperation server by executing authentication processing based on the authentication information transmitted from the printer management server, and to transmit the second authorization information to the printer management server; and providing unit configured to provide, to the printer, the print data acquired by the acquisition unit or another print data generated based on the acquired print data without executing the authentication processing based on the authentication information in response to reception of a print data acquisition request from the printer which receives the second authorization information from the printer management server.

According to another aspect of the present invention, there is provided a control method of a server system, which is configured to communicate with a document management server which provides print data, and a printer management server connected to a printer which executes print processing based on the print data, the method comprising: a receiving step of receiving, from the printer management server, information for acquiring the print data, and first authorization information which is issued by executing authentication processing based on authentication information and permits an access to the document management server; an acquisition step of acquiring the print data from the document management server based on the information for acquiring the print data using the received first authorization information without executing the authentication processing based on the authentication information; a transmission step of issuing second authorization information which permits an access to a cooperation server by executing authentication processing based on the authentication information transmitted from the printer management server, and transmitting the second authorization information to the printer management server; and a providing step of providing, to the printer, the print data acquired in the acquisition step or another print data generated based on the acquired print data without executing the authentication processing based on the authentication information in response to reception of a print data acquisition request from the printer which receives the second authorization information from the printer management server.

According to the present invention, an on-line print service in which a document management server, printer management server, and print server, which are served in different security domains, cooperate with each other can be implemented without impairing security.

Further features of the present invention will become apparent from the following description of exemplary embodiments (with reference to the attached drawings).

BRIEF DESCRIPTION OF THE DRAWINGS

FIGS. 7A and 7B show examples of a printer table and authentication information table;

FIGS. 8A and 8B show examples of an authentication information table and document data correspondence map;

FIGS. 9A and 9B show examples of a user table and token table;

FIG. 10 shows an example of a print data table;

FIG. 13 is a print sequence chart of an on-line print service according to the second embodiment.

DESCRIPTION OF THE EMBODIMENTS

The best mode for carrying out the present invention will be described hereinafter with reference to the drawings. Various service providers provide various on-line services on the Internet. A sole on-line service managed by a single service provider is available, and a method of implementing one solution by combining a plurality of on-line services managed by a plurality of service providers to cooperate between services is also available. The latter method is called "mashup", and is visible from the user as one Web site or Web service.

However, in practice, on a backend, a plurality of on-line services cooperate and are linked to combine required functions, thus implementing a solution. For example, let us assume that there is a photo sharing Web site. A service provider, which provides hosting of an HTTP server and application server for controlling the Web site, and another service provider, which provides an on-line storage facility used to store large quantities of image files, such as photos, can be combined. Note that an on-line service in this case indicates a function group provided by a Web site, Web application, Web service, and the like. The Web site, Web application, Web service, and the like are applications which run on a server computer.

First Embodiment

[System Block Diagram]

Figure 1:
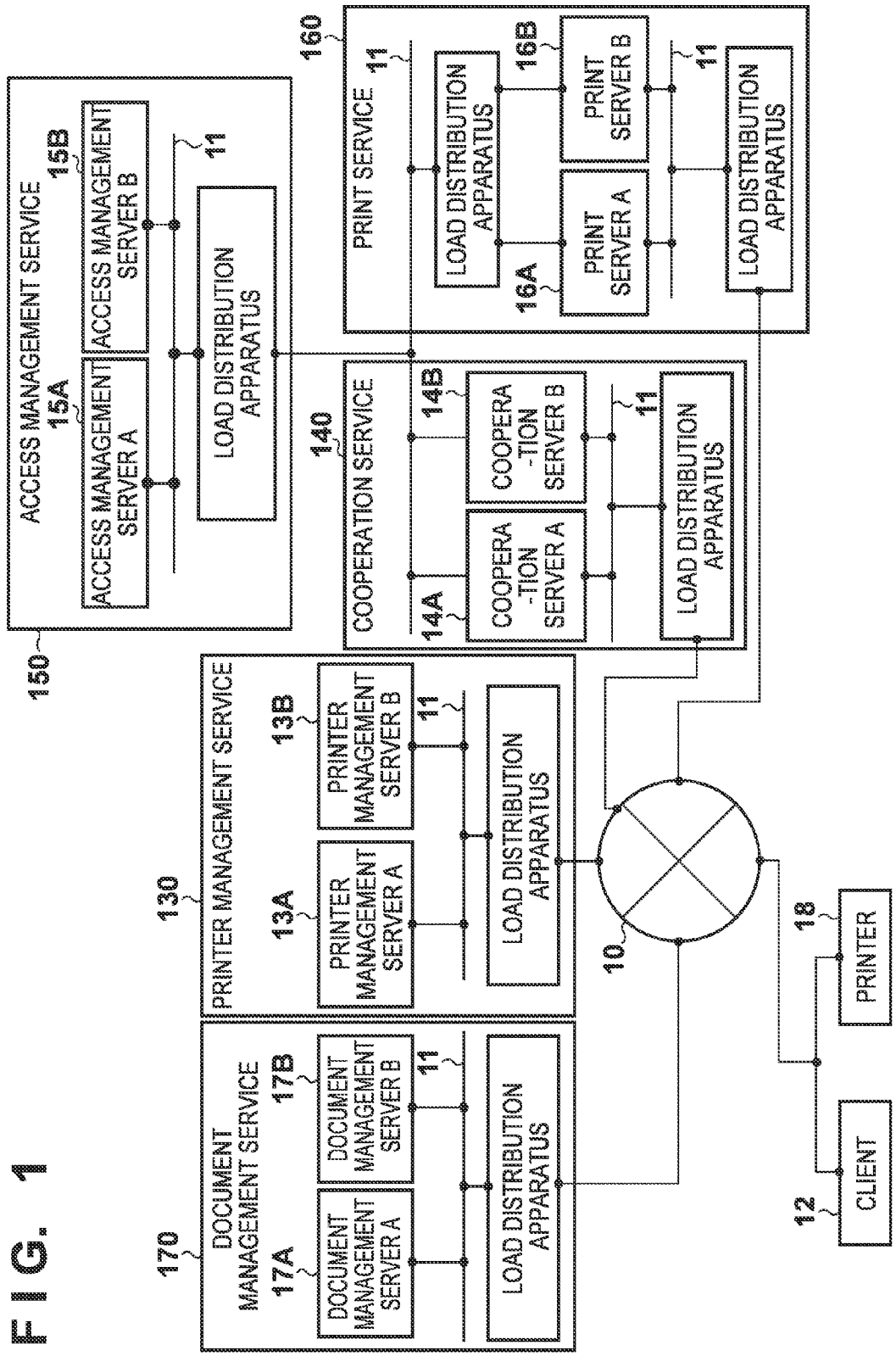
FIG. 1 is a block diagram showing an example of the configuration of a network.

FIG. 1 shows the network configuration including various on-line services which construct a print system according to this embodiment. An Internet 10 is a public network such as the Internet. An intranet 11 is a private network such as a LAN (Local Area Network). Document management servers 17A and 17B store document files of users on-line. The document management server is constructed by one or a plurality of servers, so that requests from the Internet 10 can be distributed and processed via a load distribution apparatus. When the document management server is constructed by a single server, the load distribution apparatus may be omitted. One or the plurality of document management servers, which are connected via the load distribution apparatus, provide a document management service 170. Printer management servers 13A and 13B manage printers connected to the Internet. The printer management server is constructed by one or a plurality of servers, so that requests from the Internet 10 can be distributed and processed via a load distribution apparatus. One or the plurality of printer management servers, which are connected via the load distribution apparatus, provide a printer management service 130.

Access management servers 15A and 15B manage authentication and authorization of users. The access management server is constructed by one or a plurality of servers, so that requests from the intranet 11 can be distributed and processed via a load distribution apparatus. One or the plurality of access management servers, which are connected via the load distribution apparatus, provide an access management service 150. Cooperation servers 14A and 14B control cooperation between on-line services (servers). The cooperation server is constructed by one or a plurality of servers, so that requests from the Internet 10 can be distributed and processed via a load distribution apparatus. One or the plurality of cooperation servers, which are connected via the load distribution apparatus, provide a cooperation service 140.

Print servers 16A and 16B convert document files into data which can be printed by a printer. The print server is constructed by one or a plurality of servers, so that requests from the Internet 10 can be distributed and processed via a load distribution apparatus. Likewise, these servers are constructed so that requests from the intranet 11 can be distributed and processed via another load distribution apparatus. One or the plurality of print servers 16, which are connected via the load distribution apparatus, provide a print service 160. A client 12 such as a client computer or mobile terminal is used when an on-line service is to be used. A printer 18 receives print data and executes print processing.

Note that the document management service 170, printer management service 130, and print service 160 are on-line services which are managed by different service providers, and can communicate with each other via the Internet 10.

In this embodiment, assume that a server group (first server group) including the document management servers 17 and printer management servers 13 and a server group (second server group) including the access management servers 15 and print servers 16 belong to different security domains. In this case, the respective security domains (first and second security domains) use authorization tokens of different formats. In this embodiment, an authorization token of a format used in the first server group will be described as a first authorization token, and an authorization token of a format used in the second server group will be described as a second authorization token. The authorization tokens will be described in more detail later using FIG. 7A, etc.

Figure 2:
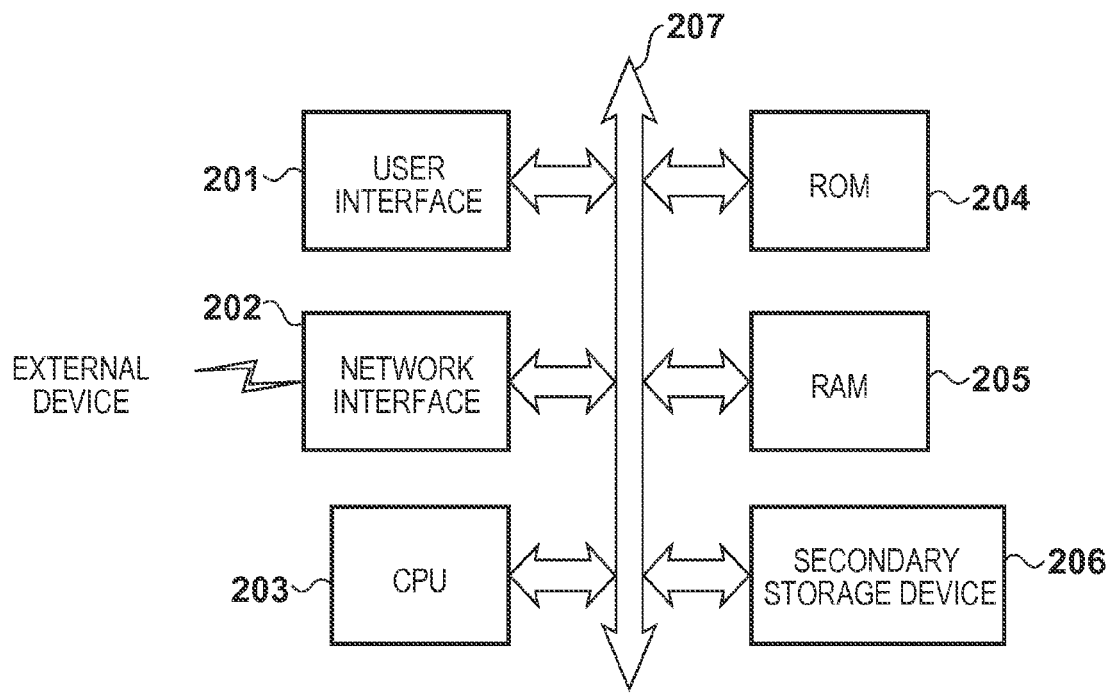
FIG. 2 is a block diagram showing an example of the arrangement of a server.

FIG. 2 shows the logical arrangement of an information processing function of a server computer which executes software of a Web site, Web application, Web service, and the like that construct various servers described above. A user interface 201 inputs/outputs information using a display, keyboard, mouse, etc. Note that a computer which does not include these hardware components can be connected and manipulated from another computer by a remote desktop function. A network interface 202 establishes connection to a network such as a LAN, and communicates with another computer and network device.

A ROM 204 records embedded programs and data. A RAM 205 is used as a temporary memory area. A secondary storage device 206 is represented by an HDD. A CPU 203 executes programs read from the ROM 204, RAM 205, secondary storage device 206, and the like to implement various services. The respective units are connected via an input interface 207. Note that the server may further include other units in addition to the above arrangement. Also, the client 12 and printer 18 may have the same arrangement. In this embodiment, with the aforementioned arrangement, the respective servers execute processes of respective sequences to be described later.

Figure 3:
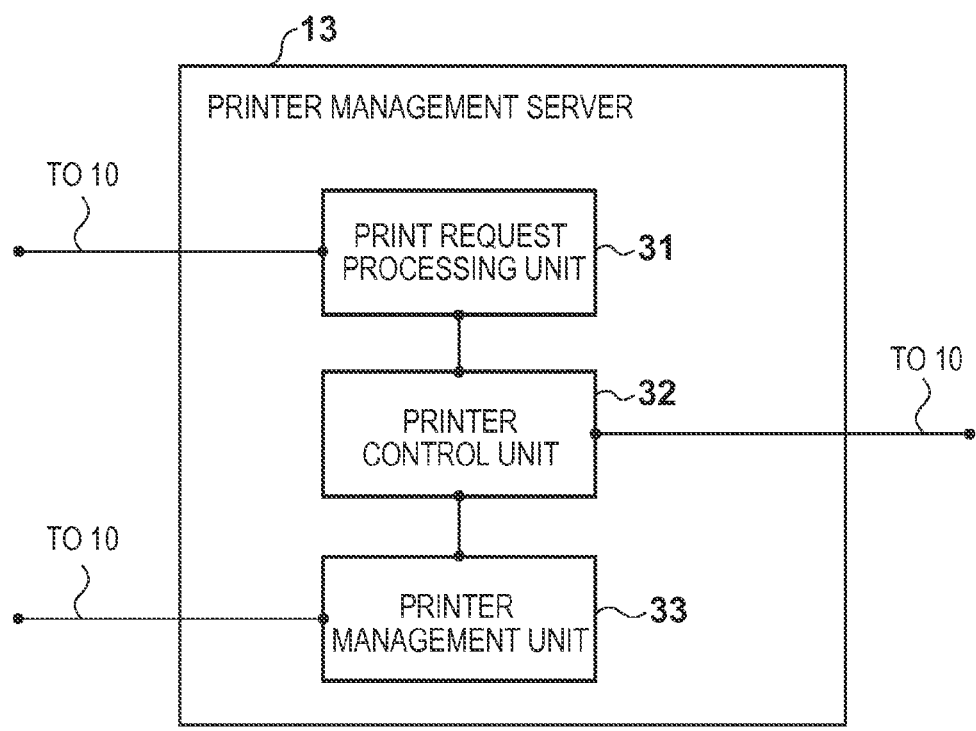
FIG. 3 is a block diagram showing an example of the arrangement of a printer management server.

FIG. 3 shows the internal structure of the printer management server 13. Respective units shown in FIG. 3 are implemented by the arrangement of the server computer shown in FIG. 2. A print request processing unit 31 receives a print request of a document from the document management server 17 via the Internet 10. A printer management unit 33 receives a polling request from the printer 18 via the Internet 10. A printer control unit 32 executes required processing in response to requests from the print request processing unit 31 and printer management unit 33, and returns response data to call sources. In this case, the printer control unit 32 transmits a print data conversion request and print request of a document file to the cooperation server 14 via the Internet 10, and receives response data as processing results of the requests. The print request processing unit 31 and printer management unit 33 return response data to call sources.

Figure 4:
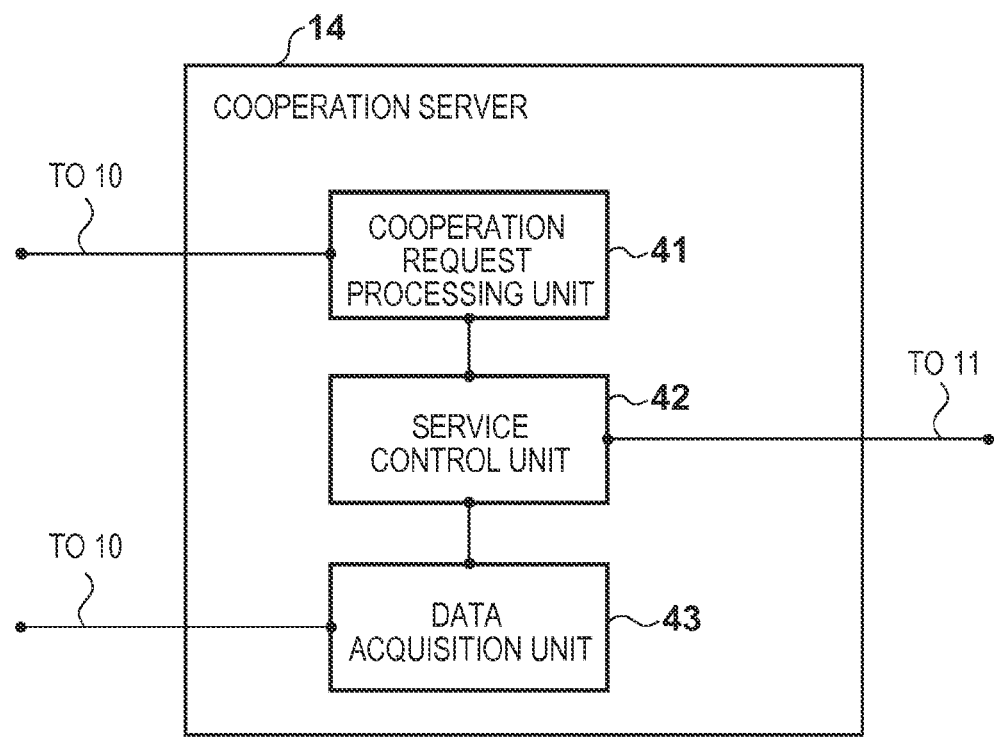
FIG. 4 is a block diagram showing an example of the arrangement of a cooperation server.

FIG. 4 shows the internal structure of the cooperation server 14. Respective units shown in FIG. 4 are implemented by the arrangement of the server computer shown in FIG. 2. A cooperation request processing unit 41 receives a print data conversion request and print request of a document file from the printer management server 13. A data acquisition unit 43 acquires document data from the document management server 17 via the Internet 10. A service control unit 42 executes required processing in response to a request from the cooperation request processing unit 41, and returns response data to a call source. In this case, the service control unit 42 transmits requests to the access management server 15 and print server 16 via the intranet 11, and receives response data as processing results of the requests. Also, the service control unit 42 transmits a document acquisition request to the data acquisition unit 43. The cooperation request processing unit 41 returns response data to a call source.

Figure 5:
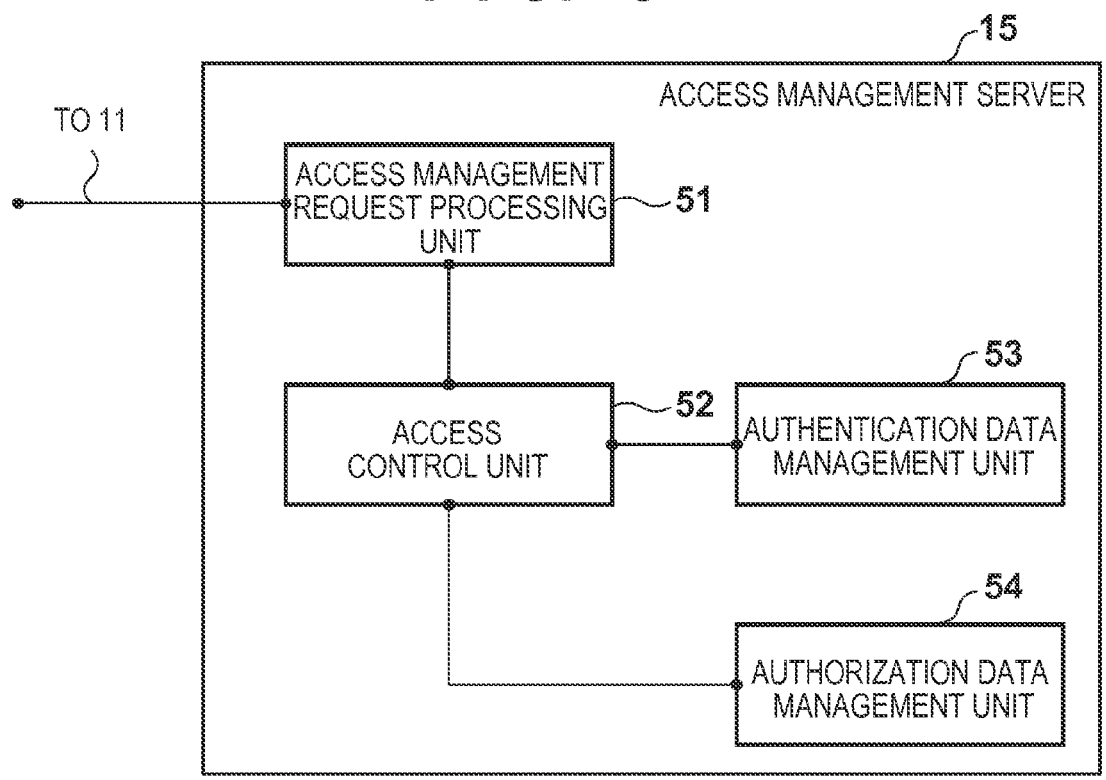
FIG. 5 is a block diagram showing an example of the arrangement of an access management server.

FIG. 5 shows the internal structure of the access management server 15. Respective units shown in FIG. 5 are implemented by the arrangement of the server computer shown in FIG. 2. An access management request processing unit 51 receives a request from another on-line service via the intranet 11. An authentication data management unit 53 manages user account data. An authorization data management unit 54 manages issued authorization token data. An access control unit 52 generates response data to an authentication/authorization request based on the data acquired from the authentication data management unit 53 and authorization data management unit 54, and returns the response data to the access management request processing unit 51. The access management request processing unit 51 returns the response data to a call source.

Figure 6:
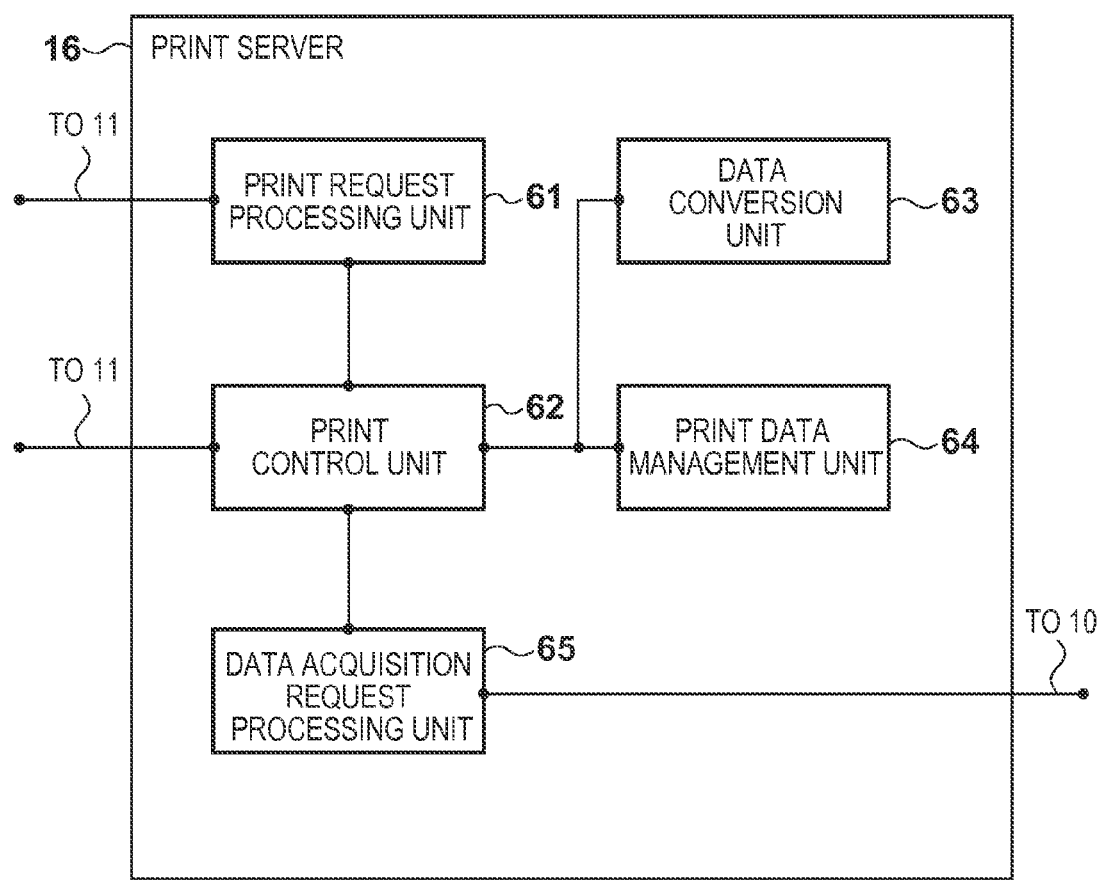
FIG. 6 is a block diagram showing an example of the arrangement of a print server.

FIG. 6 shows the internal structure of the print server 16. Respective units shown in FIG. 6 are implemented by the arrangement of the server computer shown in FIG. 2. A print request processing unit 61 receives a print data conversion request and registration request of a document file from the cooperation server 14 via the intranet 11. A data acquisition request processing unit 65 receives a data acquisition request from the printer 18 connected to the Internet 10 via the Internet 10. A data converter 63 receives the print data conversion request from a print control unit 62, converts received document data into print data, and responds with the converted data.

A print data management unit 64 registers and manages the print data as the converted document data. The print control unit 62 executes required processing in response to requests from the print request processing unit 61 and data acquisition request processing unit 65, and returns response data to call sources. In this case, the print control unit 62 transmits a request to the access management server 15 via the intranet 11, and receives response data as a processing result of the request. The print control unit 62 transmits a print data conversion request of a document to the data converter 63, receives the converted data, and registers that data in the print data management unit 64.

[Data Structure]

Data structures used in this embodiment will be described below. Assume that the same column names (for example, user ID) in respective tables indicate common items among the respective tables. Note that the data structures to be described below are examples, and may have other elements.

FIGS. 7A and 7B show the data structures held by the printer management server 13 in the form of tables. FIG. 7A shows a printer table 700. The printer table 700 includes a printer ID 701, authorization token A 702, user ID 703, password 704, and authorization token B 705 as elements. The printer ID 701 is a column used to store a printer ID of the printer 18. The authorization token A 702 is a column used to store an authorization token A as authorization information for accessing the document management server 17.

The user ID 703 is a column used to store a user ID required for authentication by the access management server 15 upon accessing the cooperation server 14 or print server 16. The password 704 is a column used to store a password as secret information of the user ID 703. The authorization token B 705 is a column used to store an authorization token B as authorization information for accessing the cooperation server 14 or print server 16. The column of the authorization token A 702 holds an authorization token issued from the document management server 17. Also, the column of the authorization token B 705 holds an authorization token issued from the access management server 15.

In this case, "authorization token" is that which is paid in response to an authorization token acquisition request including an authentic user ID/password. That is, access using this authorization token is used to grant execution of a specific function and an access to a specific URL (Uniform Resource Locator), and is limited to the granted authorization. For example, this authorization token permits use of a print service function and an access to data (URL). This authorization token is used to allow an external program or the like to execute a function by proxy of the user himself or herself. That is, when the authorization token is conferred to a program or the like, the authorization of the user is given to that program, which can execute processing by proxy. The authorization token has a life cycle within a set expiration date, and can be kept to be cyclically used within the expiration date. Note that a practical value of the expiration date will be described later using FIG. 9B.

In this embodiment, the authorization token used in the network to which the document management service 170 and printer management service 130 belong is defined as the first authorization token. By contrast, the authorization token used in the network to which the cooperation service 140, access management service 150, and print service 160 belong is defined as the second token. Then, the cooperation service 140 associates the first and second tokens with each other to convert them, thus allowing cooperation of processes in the overall system. Note that how to handle these tokens will be described later using FIG. 11 together with the processing in this embodiment.

FIG. 7B shows an authentication information table 710. The authentication information table 710 includes a client certificate 711 as an element. The client certificate 711 is a column used to store a path where a client certificate for allowing the cooperation server 14 to specify/authenticate the printer management server 13 is stored.

FIGS. 8A and 8B show the data structures held by the cooperation server 14 in the form of tables. FIG. 8A shows an authentication information table 800. The authentication information table 800 includes a server certificate 801, client ID 802, and client secret 803 as elements. The server certificate 801 is a column used to store a path where a server certificate for allowing the printer management server 13 to specify and authenticate the cooperation server 14 is stored. The client ID 802 and client secret 803 are columns used to store a client ID and client secret for allowing the cooperation server 14 to be authenticated by the access management server 15. The client ID 802 and client secret 803 are respectively the columns used to store the client ID and client secret both issued by the access management server 15. In this case, "client secret" corresponds to a password, which is used in authentication, and is issued in correspondence with a client ID.

FIG. 8B shows a document data correspondence map 810. The document data correspondence map 810 includes a first document URL 811, first authorization token 812, second document URL 813, and second authorization token 814 as elements. The first document URL 811 is a column used to store a URL which is designated when document data is acquired from the document management server 17. This URL as storage information indicates a storage destination of document data. The first authorization token 812 is a column used to store an authorization token transmitted when document data is acquired from the document management server 17. The second document URL 813 is a column used to store a URL designated when print data is acquired from the print server 16. This URL as storage information indicates a storage destination of print data. The second authorization token 814 is a column used to store an authorization token transmitted when print data is acquired from the print server 16. The first authorization token 812 corresponds to the authorization token A 702 in the printer table 700 shown in FIG. 7A. Also, the second authorization token 814 corresponds to the authorization token B 705. That is, the first authorization token 812 is issued from the document management server 17, and the second authorization token 814 is issued from the access management server 15. A method of holding data in the respective columns of the document data correspondence map 810 will be described later.

FIGS. 9A and 9B show the data structures held by the access management server 15 in the form of tables. FIG. 9A shows a user table 900, which is stored in the authentication data management unit 53. The user table 900 includes a user ID 901, password 902, and tenant ID 903 as elements. The user ID 901 is a column used to store a user ID for uniquely specifying the user. The password 902 is a column used to store a password as secret information of the user ID 901. The tenant ID 903 is a column used to store a tenant ID.

In this case, the tenant ID is an identifier for implementing multi-tenant functions. For example, assume that a certain on-line service is operated by a single system. When this on-line service is sold to a plurality of customer companies, multi-tenant functions which inhibit accesses to data of other customers and calculate service fees for respective customers are required. As an identifier for implementing such multi-tenant functions, the tenant ID 903 is inevitably given to each user ID 901. Then, for example, even when data of a plurality of tenants are stored in a single memory, users and data can be separated for respective tenants. Along with the progress of cloud services, since data of tenants which belong to different domains are managed in a single memory, the multi-tenant concept is very important in cloud computing.

FIG. 9B shows a token table 910, which is stored in the authorization data management unit 54. The token table 910 includes a token ID 911, expiration date 912, issuance date/time 913, user ID 914, tenant ID 915, and client ID 916 as elements. The token ID 911 is a column used to store a token ID for uniquely identifying an authorization token. The expiration date 912 is a column used to store a value which expresses an expiration date of a token in seconds. The issuance date/time 913 indicates a date and time of issuance of a token. The user ID 914 is a column used to store a user ID indicating a user to whom this token is issued. The tenant ID 915 is a column used to store a tenant ID to which the user ID 914 belongs. The client ID 916 is a column used to store a client ID of a client as an issuance request source of this token.

FIG. 10 shows the data structure held by the print server 16 in the form of a table. A print data table 1000 is stored in the print data management unit 64. The print data table 1000 includes a user ID 1001, tenant ID 1002, print data ID 1003, and print data 1004 as elements. The user ID 1001 is a column used to store a user ID of the user who issued a print request. The tenant ID 1002 is a column used to store a tenant ID of a tenant to which the print request user belongs. The print data ID 1003 is a column used to store a print data ID. The print data 1004 is a column used to store a path indicating a location of print data.

[Print Processing Sequence]

Figure 11:
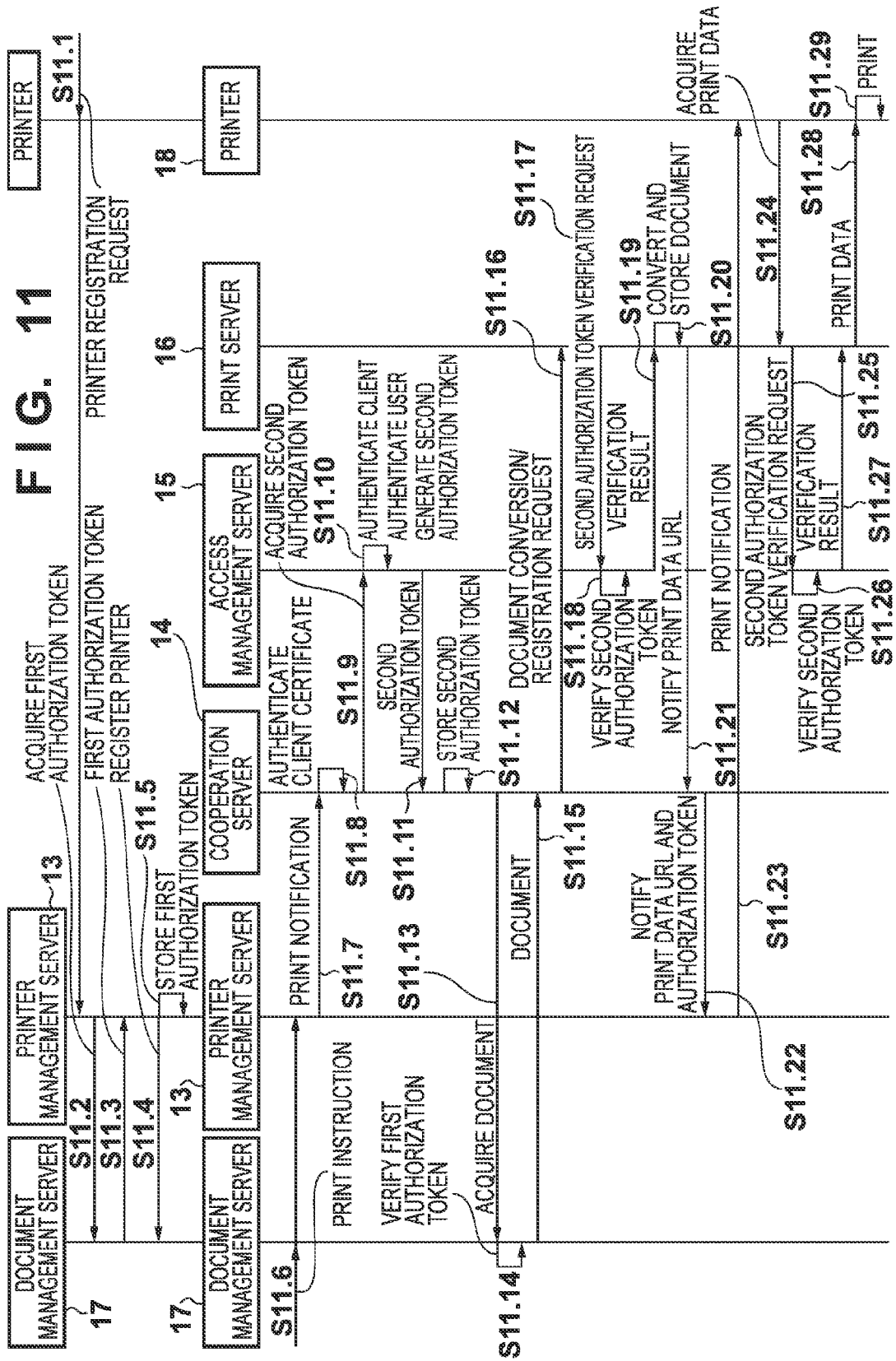
FIG. 11 is a print sequence chart of an on-line print service according to the first embodiment.

A print processing sequence in the on-line service according to this embodiment will be described below using FIG. 11. Referring to FIG. 11, the document management server 17, printer management server 13, and print server 16 are on-line services managed by different service providers, and can communicate with each other via the Internet 10. In this case, the print server 16 is access-controlled by the access management server 15, and other on-line services implement "mashup" with the print server 16 via the cooperation server 14. Assume that processes in the respective servers are implemented by the respective components shown in FIGS. 2 to 6.

A sequence for registering the printer 18 in the document management server 17 will be described first. In step S11.1 in FIG. 11, the user issues a printer registration request from the printer 18 to the printer management server 13 via the Internet 10. In the printer 18, a request reception URL of the printer management unit 33 of the printer management server 13 is set in advance. In this case, the user inputs authentication information for using the document management server 17 using an interface (not shown) of the printer 18. In step S11.2, the printer management server 13 transmits a first authorization token acquisition request to the document management server 17 using the received authentication information.

The document management server 17 verifies the authentication information received from the printer management server 13, and generates a first authorization token if that information is proper. Then, in step S11.3, the document management server 17 returns the first authorization token to the printer management server 13. In step S11.4, the printer management server 13 registers the printer in the document management server 17 using the authorization token A 702 shown in FIG. 7A (first authorization token). In this case, the printer management server 13 generates a reception URL used to receive a print instruction request by itself and a printer ID, and transmits them to the document management server 17. The document management server 17 stores the pieces of received information of the printer ID and reception URL of the printer management server 13 in association with each other. Then, the document management server 17 can transmit a print instruction request (to be described later) to the printer management server 13. After that, the registered printer 18 periodically executes polling accesses to the printer management server 13. This is because the printer management server 13 cannot directly access the printer 18 since communications are restricted in terms of security, and the printer side has to issue an inquiry to the document management server side.

Then, in step S11.5, the printer management server 13 stores the generated printer ID and the received first authorization token in the columns of the printer ID 701 and authorization token A 702 of the printer table 700, as shown in FIG. 7A. In this case, the printer management server 13 stores the user ID and password required for authentication by the access management server 15 in the columns of the user ID 703 and password 704. The printer management server 13 may generate these user ID and password, and may register them in the access management server 15 via the cooperation server 14. Alternatively, the printer management server 13 may transmit a user registration request to the access management server 15 via the cooperation server 14, and the access management server 15 may receive and register the generated user ID and password. The following description of this embodiment will be given under the assumption that the user ID and password required for authentication by the access management server 15 are registered in the printer table 700.

Also, in this embodiment, the user ID to be generated is an ID which is generated and assigned for each printer. However, the present invention is not limited to this. For example, the user ID may be generated and assigned for each user who uses the printer.

In step S11.6 in FIG. 11, the user issues a print instruction request from the client 12 to the document management server 17 via the Internet 10. In this case, screen information (not shown) generated by the document management server 17 is displayed on a Web browser (not shown) installed in the client 12. For example, the user selects a document to be printed and printer from the screen information displayed on the Web browser, thereby transmitting the print instruction request to the document management server 17. The document management server 17 specifies the stored reception URL and printer ID of the printer management server 13 based on the selected printer information, generates a print instruction request together with the selected document URL, and transmits that request to the printer management server 13.

The printer management server 13 transmits a print notification to the cooperation server 14 in step S11.7. In this case, the printer management server 13 transmits the client certificate in the authentication information table 710 shown in FIG. 7B, and the authorization token A 702, user ID 703, and password 704 of the printer ID corresponding to the print instruction in the printer table 700 shown in FIG. 7A. Furthermore, the printer management server 13 transmits the document URL received from the document management server 17 in step S11.6. The cooperation server 14 implements first acquisition means by receiving these pieces of information.

Upon reception of the print notification from the printer management server 13, the cooperation server 14 verifies the received client certificate in step S11.8. This embodiment will explain a method of establishing a communication by passing the client certificate 711 together with the server certificate in the authentication information table 800 of the cooperation server 14 and verifying the certificates by the client 12 and the cooperation server 14 mutually in the TLS/SSL (Transport Layer Security/Secure Socket Layer) mechanism. Also, a method of establishing a communication based on the server certificate, and separately sending the client certificate later may be adopted. In this case, the cooperation server 14 verifies the client certificate, and proceeds with the subsequent processes only when that client certificate is authentic. Note that when the client certificate is inauthentic, the user may be notified of information that advises accordingly.

The cooperation server 14 holds the aforementioned pieces of information received by the print notification in the document data correspondence map 810, as shown in FIG. 8B. That is, the cooperation server 14 respectively stores and holds the document URL in the column of the first document URL 811 and the authorization token A in the column of the first authorization token 812.

Next, the cooperation server 14 transmits a second authorization token acquisition request to the access management server 15 in step S11.9. At this time, the second authorization token acquisition request includes the user ID and password received by the print notification in step S11.7, and the client ID and client secret in the authentication information table 800.

The access management server 15 verifies and authenticates the client ID and client secret received from the cooperation server 14 in step S11.10. In this case, since the access management server 15 authenticates the cooperation server 14, it indirectly authenticates the printer management server 13. More specifically, the cooperation server 14 authenticates the printer management server 13 by verifying the client certificate in step S11.8. At this time, the cooperation server 14 is required to be constructed to use the client ID and client secret in the authentication information table 800 only in case of the confirmed authentic printer management server 13. That is, the cooperation server 14 authenticates the printer management server 13 using the client certificate in step S11.8, and the access management server 15 authenticates the cooperation server 14 using the client ID and client secret in step S11.10.

More specifically, when a set of the user ID and password registered in the user table 900 shown in FIG. 9A matches that of the received client ID and client secret, the access management server 15 authenticates the cooperation server 14 as an authentic client. When the client authentication has succeeded, the access management server 15 then verifies and authenticates the received user ID and password. More specifically, when a set of the user ID and password registered in the user table 900 matches that of the received user ID and client secret, the access management server 15 determines an authentic user. When the user authentication has succeeded, the access management server 15 acquires the tenant ID 903 from the user table 900, and generates a second authorization token, thus generating an authorization token ID, and registering it in the token table 910. In this case, in this embodiment, a date and time of registration are set as a date and time of issuance, and a default value defined by the access management server 15 is set as an expiration date. Then, the access management server 15 returns the generated authorization token ID to the cooperation server 14 in step S11.11.

In this case, the authorization token generated by the access management server 15 indicates that various on-line services of the security domain of the access management server 15 are authorized to be used by the authorization of the authentic user. More specifically, the print service 160 provided by the print server 16 is used when the printer 18 uses that service. In this case, document data acquired from the printer 18 has to be confirmed to be a document of the user who uses the printer 18. In this case, the generated token will be described as a second authorization token to be distinguished from the first authorization token generated by the document management server 17. The cooperation server 14 implements second acquisition means by acquiring this second authorization token.

Normally, in the case of use within a single security domain, since the user authentication has been done in step S11.1 as the registration step of the printer 18, no security problem is posed as long as the authorization token obtained by that authentication is used. However, in this embodiment, the security domain for which the user authentication has been done in step S11.1 is different from that of the print server 16 from which the printer 18 actually acquires print data. For this reason, the authorization tokens issued by the plurality of security domains have to be securely exchanged. In this embodiment, the access management server 15 indirectly authenticates the printer management server 13 in step S11.10. Furthermore, in step S11.10, the access management server 15 permits to exchange the first and second tokens by authenticating the user, thus assuring the security.

Then, in step S11.12, the cooperation server 14 stores and holds the second authorization token received from the access management server 15 in the column of the second authorization token 814 of the document data correspondence map 810, as shown in FIG. 8B.

Next, the cooperation server 14 transmits an acquisition request of the document data from the document management server 17 using the first document URL 811 and first authorization token 812 held in the document data correspondence map 810 shown in FIG. 8B in step S11.13. With this request, the cooperation server 14 acquires the document data. Then, the document management server 17 verifies the received first authorization token in step S11.14. As a result of verification of the first authorization token, if the first authorization token is authentic, the document management server 17 returns the document data of the designated URL to the cooperation server 14 in step S11.15.

The cooperation server 14 transmits print data conversion and registration requests of the document data to the print server 16 in step S11.16. In this case, the requests include the document data acquired in step S11.15, and the second authorization token held in the document data correspondence map 810 shown in FIG. 8B.

The print server 16 transmits a verification request of the received second authorization token to the access management server 15 in step S11.17. The access management server 15 executes second authorization token verification as to whether or not the received second authorization token is authentic in step S11.18. More specifically, the access management server 15 verifies whether or not the token ID of the received second authorization token is registered in the token table 910 shown in FIG. 9B, and also whether or not the expiration date of the corresponding token is expired.

The access management server 15 transmits the verification result to the print server 16 in step S11.19. In this case, when the verification result indicates "authentic", the access management server 15 transmits the user ID, the tenant ID to which the user belongs, and the client ID, which are stored in the token table 910. The print server 16 proceeds with the following processing only when the verification result indicates "authentic".

The print server 16 converts the received document data into print data, and stores the following data in the print data table 1000 shown in FIG. 10 in step S11.20. The print server 16 stores the user ID and tenant ID, which are acquired at the time of verification of the authorization token, in the columns of the user ID 1001 and tenant ID 1002. Also, the print server 16 stores the generated print data ID in the column of the print data ID 1003 and a storage URL of the print data in the column of the print data 1004. Then, the print server 16 returns the print data ID and print data URL to the cooperation server 14 in step S11.21.

The cooperation server 14 stores the received print data URL in the column of the second document URL 813 of the document data correspondence map 810. Then, in step S11.22, the cooperation server 14 transmits the second authorization token and second document URL to the printer management server 13 as a response to the requests received in step S11.16.

With the aforementioned processing sequence shown in FIG. 11, the first document data and first authorization token stored in the document management server 17 are converted into the second document data and second authorization token only when the client authentication and user authentication have succeeded.

Next, in step S11.23, the printer management server 13 notifies the printer 18 of the second authorization token and print data URL received from the cooperation server. More specifically, the printer management server 13 transmits the second authorization token and print data URL as a response to a periodic polling request received from the printer 18. In step S11.24, the printer 18 transmits a print data acquisition request to the received print data URL of the print server 16. In this case, the printer 18 transmits the second authorization token received from the printer management server 13.

In step S11.25, the print server 16 transmits a verification request of the second authorization token received from the printer 18 to the access management server 15. The access management server 15 verifies in step S11.26 whether or not the second authorization token received from the print server 16 is authentic. More specifically, the access management server 15 verifies whether or not the token ID of the received second authorization token is registered in the token table 910 shown in FIG. 9B, and the expiration date of the corresponding authorization token is expired. In step S11.27, the access management server 15 transmits the verification result to the print server 16. In this case, when the verification result indicates "authentic", the access management server 15 transmits the user ID, the tenant ID to which the user belongs, and the client ID, which are stored in the token table 910. The print server 16 proceeds with the following processing only when the verification result received from the access management server 15 indicates "authentic". Note that as a result of verification, when the authorization token is inauthentic, the user may be notified of information that advises accordingly.

The print server 16 proceeds with the following processing when a set of the user ID and tenant ID corresponding to the print data URL in the print data table 1000 shown in FIG. 10 matches that of the user ID and tenant ID acquired from the access management server 15 at the time of verification. In step S11.28, the print server 16 transmits print data stored in association with the print data URL to the printer 18 as a response. The printer 18 prints the received print data in step S11.29.

In the aforementioned processing sequence, the print processing sequence in the on-line service according to this embodiment is implemented. More specifically, even in an environment in which the document management server 17, printer management server 13, and print server 16 are on-line services managed by different service providers, respective server groups of the different security domains can be cooperated via the cooperation server 14. As a result, according to the present invention, the services of both the server groups of the different security domains can be mashed up in an advanced manner. Only in the case of a client which is authenticated via the access management server 15, the authorization token (second authorization token) is issued, thus implementing a secure on-line print service.

Second Embodiment

In the first embodiment, the printer management server 13 executes authentication of the on-line service using the client certificate. For this purpose, the cooperation server 14 authenticates the printer management server 13 using the client certificate, and is then authenticated by the access management server 15 using the corresponding client ID and client secret. That is, the access management server 15 indirectly authenticates the printer management server 13. The second embodiment will explain a method in which the cooperation server 14 does not authenticate the printer management server 13, and passes authentication information to the access management server 15 to authenticate the printer management server 13. This arrangement is more secure without the intervention of authentication by the cooperation server 14 since the access management server 15 directly authenticates the printer management server 13.

[Data Structure]

Figure 12:
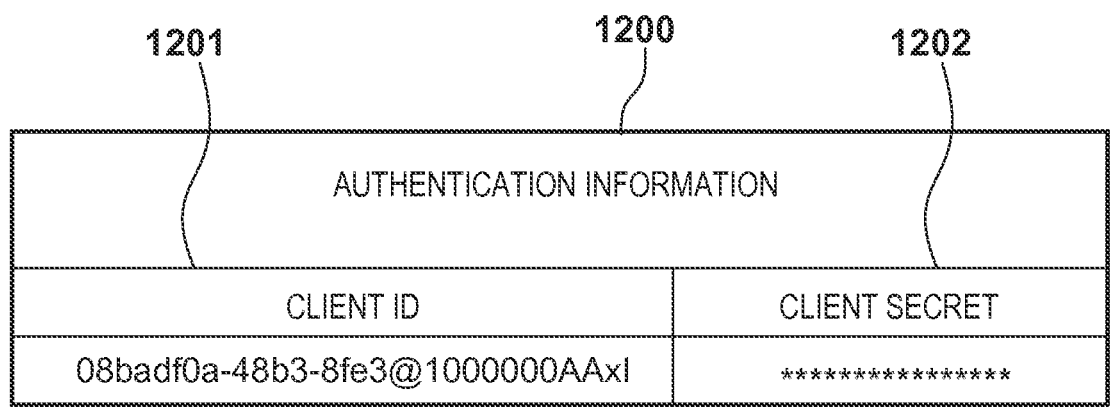
FIG. 12 shows a data example of a cooperation server according to the second embodiment.

FIG. 12 shows an authentication information table 1200 held by the printer management server 13 according to the second embodiment. The authentication information table 1200 includes a client ID 1201 and client secret 1202 as elements. The client ID 1201 and client secret 1202 are respectively columns used to store a client ID and client secret required for the printer management server 13 to be authenticated by the access management server 15. The client ID 1201 and client secret 1202 are respectively the columns used to hold the client ID and client secret issued from the access management server 15. Note that although not shown, the authentication information table 800 in FIG. 8A which is held by the cooperation server 14 in the first embodiment need not store the client ID 802 and client secret 803.

[Print Processing Sequence]

FIG. 13 shows a print processing sequence in an on-line service according to the second embodiment. Note that the same step numbers denote the same processes as in FIG. 11 of the first embodiment, and a description thereof will not be repeated. Differences from the first embodiment will be mainly described below.

As in FIG. 11, in step S11.6 of FIG. 13, the user issues a print instruction request from the client 12 to the document management server 17 via the Internet 10. The printer management server 13 transmits a print notification and client authentication request to the cooperation server 14 in step S13.1. In this case, the printer management server 13 transmits the client ID and client secret in the authentication information table 1200 shown in FIG. 12, the authorization token A, user ID, and password of a printer ID corresponding to the received print instruction in the printer table 700 shown in FIG. 7A, and a document URL received from the document management server 17.

Upon reception of the print notification from the printer management server 13, the cooperation server 14 transmits a second authorization token acquisition request to the access management server 15 in step S13.2. The second authorization token acquisition request includes the user ID, password, client ID, and client secret received by the print notification in step S13.1. Then, in step S11.10, the access management server 15 verifies the received authentication information. Client authentication executed in this step is authentication for the printer management server 13 unlike in the first embodiment. The processing after the client authentication for the printer management server 13 is the same as that in FIG. 11.

According to this embodiment, a secure on-line print service can be implemented.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-179915, filed Aug. 19, 2011, which is hereby incorporated by reference herein in its entirety.

What is claimed is:

1. A server system, which is configured to communicate with a document management server which provides print data, and a printer management server connected to a printer which executes print processing based on the print data, said server system comprising:

receiving unit configured to receive, from the printer management server, information for acquiring the print data, and first authorization information which is issued by executing authentication processing based on authentication information and permits an access to the document management server;

acquisition unit configured to acquire the print data from the document management server based on the information for acquiring the print data using the received first authorization information without executing the authentication processing based on the authentication information;

transmission unit configured to issue second authorization information which permits an access to the server system by executing authentication processing based on the authentication information transmitted from the printer management server, and to transmit the second authorization information to the printer management server; and providing unit configured to provide, to the printer, the print data acquired by said acquisition unit or another print data generated based on the acquired print data without executing the authentication processing based on the authentication information in response to reception of a print data acquisition request from the printer which receives the second authorization information from the printer management server.

2. The server system according to claim 1, wherein the information for acquiring the print data is a URL (Uniform Resource Locator) indicating a storage location of the print data provided by the document management server.

3. The server system according to claim 1, further comprising:

confirmation unit configured, when the print data acquisition request is received from the printer, to confirm whether or not the second authorization information transmitted from the printer has been issued, and to confirm whether or not the second authorization information transmitted from the printer falls within an expiration date, wherein in the case that it is confirmed that the second authorization information transmitted from the printer has not been issued yet or falls outside the expiration date although the second authorization information has been issued, said providing unit is configured not to provide any print data to the printer, and in the case that it is confirmed that the second authorization information transmitted from the printer has been issued and falls within the expiration date, said providing unit is configured to provide the print data acquired by said acquisition unit or the other print data generated based on the acquired print data.

4. The server system according to claim 1, wherein said server system is a server group including a cooperation server, a print server, and an access management server, the cooperation server is a server for cooperating with the printer management server and the document management server, and comprises said receiving unit, said acquisition unit, and a unit configured to transmit second authorization information issued by the access management server to the printer management server, the print server is a server for cooperating with the printer, and comprises said providing unit, and the access management server is a server configured to execute authentication processing for accessing other servers included in the server group, and comprises said confirmation unit, and unit configured to execute authentication processing based on authentication information transmitted from the printer management server, and to issue the second authorization information for permitting access to the cooperation server.

5. A control method of a server system, which is configured to communicate with a document management server which provides print data, and a printer management server connected to a printer which executes print processing based on the print data, the method comprising:

a receiving step of receiving, from the printer management server, information for acquiring the print data, and first authorization information which is issued by executing authentication processing based on authentication information and permits an access to the document management server;

an acquisition step of acquiring the print data from the document management server based on the information for acquiring the print data using the received first authorization information without executing the authentication processing based on the authentication information;

a transmission step of issuing second authorization information which permits an access to the system server by executing authentication processing based on the authentication information transmitted from the printer management server, and transmitting the second authorization information to the printer management server; and a providing step of providing, to the printer, the print data acquired in the acquisition step or another print data generated based on the acquired print data without executing the authentication processing based on the authentication information in response to reception of a print data acquisition request from the printer which receives the second authorization information from the printer management server.

6. A non-transitory computer-readable medium storing a program which, when run on a computer, causes the computer to act as a server system according to claim 1.

7. A system including a printer which executes print processing based on print data and a server system which is configured to communicate with a document management server which provides the print data and a printer management server connected to the printer, the server system comprises:

receiving unit configured to receive, from the printer management server, information for acquiring the print data, and first authorization information which is issued by executing authentication processing based on authentication information and permits an access to the document management server;

acquisition unit configured to acquire the print data from the document management server based on the information for acquiring the print data using the received first authorization information without executing the authentication processing based on the authentication information;

transmission unit configured to issue second authorization information which permits an access to the server system by executing authentication processing based on the authentication information transmitted from the printer management server, and to transmit the second authorization information to the printer management server; and providing unit configured to provide, to the printer, the print data acquired by the acquisition unit or another print data generated based on the acquired print data without executing the authentication processing based on the authentication information in response to reception of a print data acquisition request from the printer which receives the second authorization information from the printer management server, and the printer comprises:

print unit configured to print the print data or the other print data generated based on the print data.

* * * * *